United States Patent Office 3,202,514
Patented Aug. 24, 1965

3,202,514
ANIMAL FOOD AND METHOD OF MAKING
THE SAME
Hovey M. Burgess, Greenwich, Conn., and Robert W.
Mellentin, St. Anne, Ill., assignors to General Foods
Corporation, White Plains, N.Y., a corporation of
Delaware
No Drawing. Filed July 15, 1963, Ser. No. 295,604
16 Claims. (Cl. 99—2)

This application is a continuation-in-part of prior applications Serial Number 829,510, filed July 27, 1959, now abandoned, and Serial Number 216,723, filed August 14, 1962, now abandoned, as a continuation-in-part of said application Serial Number 829,510.

This invention relates to a novel food for animals and to a method of making the same. More particularly, it relates to a novel animal food particularly characterized by a high degree of palatability, high nutritional and caloric value, and the faculty of being stored and marketed in a substantially nonrefrigerated condition without the need for commercial sterilization in hermetically sealed packages.

Animal foods and particularly dog and cat foods are commonly prepared for the consumer in two forms: the meal-type ration which has a dry more-or-less cereal-like texture and a low moisture content, typically about 10%; and the canned-type ration which has a more-or-less meat-like texture and a high moisture content in the neighborhood of 75%. Due in large measure to the difference in moisture content, these two forms of animal foods have widely divergent product characteristics, some desirable and some undesirable. Such foods are generally formulated from: (i) meat and/or meat by-products, or (ii) one or more vegetable protein sources as well as combinations of these together with (iii) other nutritional supplements.

Meal-type animal foods, on the one hand, generally have a very high nutritional and caloric value, providing a complete and balanced diet for the animal, and excellent storage characteristics, thus permitting the use of relatively inexpensive packaging techniques. However, the palatability of many dry meal-type animal foods is poor and, in many cases, the animal will not eat them at all in dry form, necessitating the addition of liquids prior to their consumption; liquid addition often fails to solve the palatability problem since the products become mushy or doughy and are rejected by the animal if there are any other foods available; moreover, such reconstitution fails to bring forth the inherent initial palatability factor possessed by meat and meat by-products. Therefore, the desirable nutritional characteristics of this form of animal fod may be defeated by its relatively poor palatability. In general product stabilization against microbiological spoilage is achieved in such a product by maintining the moisture content below the critical level for vegetative growth of such organisms as yeasts, molds, and bacteria.

Canned-type animal foods, on the other hand, are generally received very favorably by animals, apparently due in part to their meat-like texture, consistency and aroma. However, the elevated moisture content of such products neecssitates thermal processing in sealed containers to obtain a commercially sterile product, thereby adding considerably to product cost. Furthermore, once such a can is opened, it must be quickly consumed since the product is quite conducive to supporting microbiological growth and hence will deteriorate very rapidly unless stored under refrigeration.

In general, the concept of an intermediate moisture product, that is, one having a moisture content in excess of 10% and substantially below 75% has been largely overlooked. To be sure, an increase in the moisture level of many animal or pet food products will increase the palatability thereof. However, any significant elevation of the moisture level of such foods above 10% leads to microbiological decomposition unless such products are packaged in a hermetically sealed container and commercially sterilized or maintained in a frozen or refrigerated state throughout the period of distribution and storage by the consumer. Such packaging or preservation methods are expensive and not convenient to the consumer under all anticipated conditions of use. In any event the concept of an intermediate moisture product for sale as animal or pet food, i.e., a product intended for distribution at a moisture level above 10% by weight has, in the main, escaped the attention of prior art workers. Certain prior art workers, to wit, Hallinan et al., as disclosed in Canadian Patent No. 560,490, dated July 15, 1958, disclose compounding a "condensed" product at a moisture level of about 30–40% as well as products equivalent in moisture level to conventional canned-type products, provided certain specified processing and packaging conditions are met. The approach disclosed by Hallinan et al. inovlves adjustment of product pH to an acidic value from 2.0 to 5.0 and the optional employment of minor levels of dissolved sugar solids to contribute to an alleged "initial destruction of micro-organisms in processing and help inhibit growth of surviving organisms." Essential to the requisite inhibition of microbiological growth by the Hallinan et al. process is a thorough pasteurization of product, maintainence of these pasteurization conditions throughout package filling and closing with collateral avoidance of occluded air pockets and further manipulations of container content to assure hot product contact with the package. Further, Hallinan et al. state that such package must be sealed sufficiently tight to prevent the entry of micro-organisms and that the packaging material, besides performing this critical function, must meet certain other requirements, namely, retain water vapor and resist attack by water, acid and fat present in the product. While Hallinan et al. disclose that certain packaging materials, to wit, polyvinylidine chloride are "satisfactory" to package such formulations, they apparently found that such pet compositions per se support mold growth despite this "hot" packaging precaution due to loss of package integrity, giving rise to an unsightly appearance and in some cases obnoxious gas pockets within the package casing and collateral contamination by mold growth. Hallinan et al. discount their product limitations by minimizing the effect of mold on product quality, a treacherous product limitation when certain molds can be demonstrated as producing substances toxic to animals.

Moreover, if one deviated from the critical conditions disclosed in Hallinan et al., viz., "hot" packaging and adjustment of product pH to an acid range, microbiological decomposition and spoilage is encountered on a scale which, heretofore, rendered such a product unfit for animal consumption.

In addition, the acid values in Hallinan et al.'s composition will hydrolyze the sugars and proteins present giving rise to unsightly darkening as well as off odors in the product. Importantly, moreover, a product of a high acid value detracts from palatability. Yet animal food formulators and processors apparently have believed that in order to stabilize a product of more than about 10% moisture without commercial sterilization or freezing, pH adjustment to less than 4.5 as well as "hot" packaging was necessary.

It is an object of the present invention to provide a moist animal food having a high degree of palatability, such that the animal receives it favorably; having microbiological stability such that it can be packaged using conventional moisture-protective wrapping materials while eliminating the necessity for hot packing or thermal sterilization incident to packaging and can be stored for extended periods of time under nonrefrigerated conditions without incurring any significant risk of microbiological spoilage, of recontamination or of product discoloration; having the property of lending itself to simple processing under ambient temperatures without the necessity for packaging in such manner as to prevent occlusion of air and assuring intimate contact of the product with the packaging material; and having a high nutritional and caloric value, such that it provides all of the necessary constituents for a balanced animal ration.

A more specific object of the invention is to provide a ration of pet or other animal food avoiding all the foregoing prior art product limitations and achieving the aforestated product and process objectives while employing conventional animal protein and/or vegetable protein sources therein as well as other optional proteinaceous and nutrition supplementing and balancing ingredients.

In accordance with the present invention, a variety of "intermediate moisture" animal foods of high palatability and nutrition as well as practical shelf life, even when packaged in inexpensive water-impermeable packaging material, and otherwise meeting all of the aforementioned objects is provided by formulating a pathogen-free matrix of normally biological growth-supporting constituents and dispersing an aqueous phase of water soluble solids uniformly throughout this matrix, the soluble solids being principally sugar and being present at a level at least high enough to exert a bacteriostatic effect sufficient to stabilize the animal food. The animal food will have a moisture content less than 30% and greater than 15% and a level of water soluble solids between 15% and 35% by weight of the total composition. As will be explained hereinafter, the water soluble solids, while predominantly sugar, may also contain other low average molecular weight materials such as sorbitol, propylene glycol, and common table salt (sodium chloride) capable of endowing the animal food with microbiological protection due to the osmotic pressure effect of these water soluble solids per se. Since the animal food finds its primary and advantageous application in the marketing of a product adapted to be aerobically packaged under ambient temperatures, the composition necessarily contains that level of water soluble solids which will exert a bacteriostatic effect on the mesophilic organisms but uniquely does not call for overt employment or creation of any acidulant to control bacterial growth.

By virtue of the ability to process and package the intermediate moisture animal food of this invention without resorting to commercial sterilization or other means to arrest bacterial spoilage, the processing and packaging which can be practiced in accordance with the present invention can give rise to collateral mold and yeast development; the animal food will therefore also have incorporated therein an antimycotic serving to prevent the growth of yeasts and molds which are adaptable to high soluble solids concentrations at the intermediate moisture range employed. Indeed, an antimycotic will be found to be essential, the manner of incorporation of such an agent not being critical. Some antimycotics will preferably be incorporated with the ingredients being processed to form the animal food, whereas others may simply be sprayed or otherwise surface coated on the product, and still others may be applied to the enwrapment which is in contact with the product surface, as will be discussed hereinafter.

The materials chosen to afford a balanced and complete animal ration will preferably include a proteinaceous meaty material, a vegetable protein source, a ration-balancing protein supplement and other nutritional supplements, although one or more of these components may be omitted depending upon animal preference and nutritional requirements. The term "proteinaceous meaty material" refers to the group consisting of meat, meat by-products and meat meal as well as mixtures of these. The term "meat" is understood to apply not only to the flesh of cattle, swine, sheep and goats, but also horses, whale and other mammals, poultry and fish. The term "meat by-products" is intended to refer to those non-rendered parts of the carcass of slaughtered animals including but not restricted to mammals, poultry and the like and including such constituents as are embraced by the term "meat by-products" in the Definitions of Feed Ingredients published by the Association of American Feed Control Officials, Incorporated. Likewise, the term "meat meal" refers to the finely ground, dry rendered residue from animal tissues including those dried residues embraced by the term in the aforesaid official definition of the Association of American Feed Control Officials, Incorporated. Indeed, the terms "meat," "meat by-products," and "meat meal" are understood to apply to all of those animal, poultry and marine products defined by said association.

The term "vegetable protein source or concentrate" applies to oil seeds and legumes; as well as the oil-expressed or extracted meals and cakes and protein isolates thereof recovered by acid or alkali digestion and precipitation; typical of such vegetable protein sources are soybean, soybean meal, cotton seed meal, peanuts, peanut meal, etc., all of which terms are well understood and similarly defined or understood by said association.

The term "ration-balancing protein supplement" is intended principally to refer to milk products as defined by said association and hence includes such additives as dried buttermilk, dried skimmed milk, dried whole whey, casein and cheese rind, although it also includes yeast as that term is defined by said association and hence refers to such materials as distillers' dried yeast, primary dried yeast, irradiated dried yeast, brewers' dried yeast and torula dried yeast. However, the term protein supplements is not to be understood as restricted to the aforesaid definition.

The term "sugar" as it is employed in the present context is to be understood as meaning any of a number of useful saccharide materials which are capable of increasing the osmotic pressure of the water in which they are dissolved and thereby giving rise to the requisite bateriostatic effect. Included in the list of useful sugars are the non-reducing and reducing water-soluble mono-saccharides and the reducing and non-reducing polysaccharides and their degradation products; e.g., pentoses, including aldopentoses, methylpentoses, keptopentoses, like xylose and arabinose; a deoxyaldose like rhamnose, hexoses and reducing saccharides such as aldo hexoses like glucose, galactose and mannose; the ketohexoses, like fructose and sorbose; disaccharides, like lactose and maltose; non-reducing disaccharides such as a sucrose and other polysaccharides such as dextrim and raffinose; and hydrolyzed starches which contain as their constituents oligosaccharides. The sugars should be of a low molecular weight so as to offer a substantial effect in increasing the osmotic pressure of the sugar solution.

A typical product produced in accordance with this invention and having a substantially neutral pH comprises, for example proteinaceous meaty material, vegetable protein concentrate and a sugarlike sucrose. In such a case, the proportions of meat or meat by-products, when used, and sugar are controlled so that the water content of the product (arising mostly from the meat) will be typically about 25% and sufficient to hydrate the vegetable protein source and any other non-water soluble solids or matrix materials in the ration. In the case of a composition based primarily on meat meal, extraneous water will be overtly added to hydrate the meal as well as the vegetable protein source and any other non-water soluble solids in the ration, the weight level of water-soluble solids, including the sugar, also being at least equal to that of the water. During such limited thermal treatment as occurs during pasteurization, a major proportion by weight of the non-water solubles are hydrated. While it is not certain and the present invention is not to be restricted in its understanding or scope to any particular theory, it appears that this water uptake is responsible for assuring the presence of an adequate level of a saturated sugar solution which eliminates the need for reliance upon acidulents in inhibiting bacteriological growth.

Since the novel product of this invention, when prepared in the manner herein disclosed, is characterized by its substantially complete resistance to bacterial decomposition, but can serve as a host for yeasts and mold (particularly when packed aerobically), the animal foods of the invention will have the antimycotic agent incorporated at a sufficient level to prevent the growth of such organisms. Sorbate salts such as potassium sorbate as well as sorbic acid can be used either separately or in combination. Propylene glycol which may be used alone or with other humectants like sorbital to impart a degree of product softness or tenderness has also been found to serve as an anti-mycotic. Other anti-mycotic agents will be apparent to those skilled in the art. The amount of anti-mycotic agent added is selected so as to produce the desired results and will constitute a minor proportion of the product, say from about 0.1% to about 2.5% of the total weight, depending on the particular anti-mycotic and the particular product composition, although even lower levels in the order of 50 p.p.m. can be employed in the case of some anti-mycotics as pimaricin. Potassium sorbate in a water solution can be sprayed into the surface of the animal food or the food can be dipped in this solution; other anti-mycotics lend themselves to such surface application as esters of the parabens (para-hydroxy benzoate) such as propyl and methyl parabens (methyl parahydroxy benzoate). Cellophane and other enwrapments for the food can be spray coated with a sorbic acid solution but impregnation or dusting with sorbic acid or potassium sorbate is preferred. Anti-mycotics which can generally be used are benzoic acid, sodium benzoates, proprionic acid, sodium and calcium proprionate, sorbic acid, potassium and calcium sorbate, propylene glycol, diethyl pyrocarbonate, menadione sodium bisulfite (vitamin K).

Sugar is employed as the principal source of water soluble solids and may range upwardly in weight percentage of the composition anywhere from 15% to 35% depending upon the particular sugar or sugar mixture relied upon to offer the desired bacteriostatic protection. As the moisture content of the product increases in the intermedate moisture range, the level of a given sugar will correspondingly increase in order to maintain a sufficient bacteriostatic effect. The level of sugar chosen will also vary depending upon the presence and level of auxiliary water soluble solids also offering a similar increase in osmotic pressure to the aqueous phase of the composition; thus, a variety of low average molecular weight materials may be included as part of the water soluble solids in the aqueous phase and will augment the sugars in their role of providing sufficient osmotic pressure to prevent bacterial decomposition.

The term "water soluble solids" is understood, therefore, to apply to any animal feed or feed additive material which is substantially soluble in water at room temperature or at temperatures comparable to those practiced in processing the ingredients of the dog food composition. Included in the class of water soluble non-sugar solids that can be employed are certain inorganic salts used at a level compatible with palatability requirements, e.g., sodium chloride and potassium chloride. Indeed, certain compounds like the diols and polyols, propylene glycol, sorbitol, glycerol and the like which have another function, i.e., as anti-mycotic and/or texturizers may also be relied upon to afford the soluble solids employed in the aqueous phase for bacteriostatic protection; the propylene glycol is prominent in this respect since it is capable of serving a multiple role as mold inhibitor and plasticizing humectant for texture as well as contributing to the water soluble solids of the aqueous phase; for these reasons propylene glycol is most preferred as an additive for use in combination with the matrix materials.

The relative weight percent of said water soluble solids to the moisture content of the total product, when initially incorporated into the product during its manufacture and preparatory to packaging determines the ultimate functionality of the solids in providing the requisite bacteriostatic effect. The level of water soluble solids may be varied as may the level of moisture initially incorporated within the aforesaid respective ranges. However, in varying these levels the relationship of the water soluble solids in solution to the water should be controlled so as to afford the desired osmotic pressure. A good rule to observe in this connection is to be sure that the weight of water soluble solids available for solution is at least equal to the weight of the moisture present, although in some cases it is possible that a lower level of water soluble solids might afford some protection against microbiological decomposition provided an equivalent degree of osmotic pressure is available to protect the matrix material. In any event, it will be found that the level of sugar that should be employed under the conditions of the present invention will constitute a major percent by weight of the water soluble solids.

Although for most protein sources such as are available from the proteinaceous meaty materials and/or the vegetable proteins as defined herein, a balanced ration for most animal food compositions per se will call for their use at such a level as will require no more than 35% water soluble solids, a still higher level of water soluble solids, represented again mainly by sugar as a major proportion thereof, may be employed. Thus, a concentrated protein source may be employed at such a level by weight of the total animal food composition that it would be feasible to use a level of sugar solids higher than 35% for functional purposes such as modifying its texture or bulking as a carbohydrate filler; in such applications the level of sugar solids can be well above 35% and constitutes a major proportion of the total animal food composition. However, generally the requisite bacteriostatic protection afforded in accordance with the present invention will be achieved when the water soluble solids content reaches 35% by weight and any balance thereabove of such sugar solids will be employed for other functional properties.

The water or moisture content of the product functions to impart plasticity, etc.; i.e., to permit the product to be readily deformed by pressure (formed, mixed, pressed, molded, etc.) and retain the shape imparted to it by such pressure deformation. Typically, the water content will be above about 16%–17% and below about 26%–27%. Most desirably it will be maintained more-or-less at about 25%. A water content substantially above this preferred range makes the product too mushy and non-handleable thereby resulting in failure of the product to retain the desired shape, and reduces the shelf life due to a reduction of the bacteriostatic effect of the solids dissolved in the product's water phase, while lower moisture contents reduce workability thereby preventing ready deformation or shaping and most importantly reduce palatability. If necessary, some or all of the desired water content of the product may be provided by the addition of water; however, more commonly the components of the mixture such as the meat or meat by-products which may contain 70% moisture provide sufficient moisture when heated to produce the requisite moisture content for dissolving the sugar solids forming the water phase in the final product.

The soluble solids used in practicing this invention will preferably include any of the common sugars which are soluble in the aqueous phase of the product. Commonly, the sugar solids, e.g., sucrose, will have been dissolved in water to an extent such that the sugars together with the other water soluble solids present comprise at least 50% by weight of the aqueous phase, typically 55%–65%; such concentrations are found to produce the desired bacteriostatic effect, i.e., inhibition of bacterial growth, when the level of soluble solids is sufficiently high in relation to the water content of the product. The product of the invention will preferably contain 20%–25% sugar.

The requisite level of soluble solids, with respect to sugars particularly, will also be determined by desired product plasticity criteria. Many of the water soluble solids usable as adjuncts to the sugars in the aqueous phase; to wit, propylene glycol and sorbitol, will also play a role in producing a pliable meat-like texture to the product. Thus, propylene glycol and sorbitol, each employed at 2% levels, respectively, sufficiently plasticize the product that its moisture content may be reduced. The level of such texturizing humectant used may range from 0.5 to 4.0%.

Unpredictably, at the intermediate moisture level desired for product plasticity; i.e., between 15% to 30% moisture by weight of the composition, the water soluble solids in the aqueous phase, principal among which will be the overtly-added sugars, will per se offer the requisite protection against microbiological decomposition even when the product is packaged without employing commercial sterilization processing and packaging techniques; thus, simple enwrapment in the patty form with a flexible packaging material and offering minimal protection aganst possible recontamination from the atmosphere or the packaging material itself suffices to protect the product. This unique role of the soluble solids, particularly, the sugars of the aqueous phase, is high-lighted by the ability to advantageously formulate the product without the overt addition or creation of the acidulent heretofore commonly thought to be necessary, e.g., phosphoric acid or lactic acid.

The term "texturizer" is to be understood as covering a broad class of materials capable of modifying the tendency of dissolved sugar solids contained herein and the hydrated matrix materials to alter in their desired product softness and plasticity. Preferable among the various texturizers which will find application in accordance with this invention are humectants like sorbitol, propylene glycol and like polyhydric materials which are hydrophilic in character. Other texturizers which may be employed in accordance with this invention are sugars such as invert sugar which contains dextrose and levulose, as well as maltose and corn syrup solids, which are per set difficultly crystallizable and which function in such manner in solutions containing large quantities of other sugars like sucrose so as to retard or control crystallization. Also of use in maintaining a desirable moist plastic condition in the composition, that is, one in excess of 15% and less than 30% moisture, are the class of hydrophilic-lipophilic emulsifying agents typified by the partial esters of polyols and higher fatty acids like glycerol and propylene glycol mono- and di-esters of the saturated and unsaturated fatty acids such as stearic and palmitic, which emulsifiers it has been observed also retain the moisture in the product to a degree which materially offsets the tendency of the product to undergo a change of texture; the precise mechanism whereby such emulsifying agents act in the present system is not fully understood but it is found that these emulsifying agents do serve to emulsify the fat phase of the meat constituents and apparently thereby avoid a loss of soft texture during the anticipated storage and use of the product.

The choice of the meat constituent will be dictated by the taste preferences of the animals to which the product is to be fed. In the preferred embodiment, the meat content will be between about 25% and 35% of the total weight of the product, and in a typical product, it may for example be 30%–32%. The meat content of the product will form part of the matrix with which the other constituents of the product will be combined. The meat may be in any desired form, but if processed in the manner as hereinafter described, it will be in finely divided particulate form or more preferably in more-or-less liquid form.

In a preferred embodiment of this invention, the product will include as a vegetable protein source a vegetable protein concentrate, in addition to the meat and sugar. This concentrate raises the total protein level of the mixture to the desired nutritive level while simultaneously contribtuing to the water absorbent properties and to the appearance of the product. Preferred among the vegetable protein concentrates which may be employed include oil seeds and legumes in a deoiled form as produced by oil expression or solvent extraction. Typical vegetable protein concentrates include soy flakes (the preferred concentrate) and other deoiled soy meals, as well as deoiled concentrates derived from cottonseed, peanuts, flaxseed, beans, etc. These materials, in addition to their contribution to the nutritional content of the product and to its water adsorptive and plastic properties, also enhance the product appearance by forming whitish fat-like spots which (when viewed with the remainder of the product) produces an appearance very closely resembling ground beef containing natural fat. The amount of vegetable protein concentrate used may be varied as desired in order to produce the desired nutritional value and typically will be present in amounts of 25%–40%, say 30%. The vegetable protein concentrate may be advantageously added in the form of a mixture of flakes and flour including 20%–30%, say 20%, soy flour and 5%–10%, say 10%, soy flakes.

In one preferred embodiment of this invention, the product will contain 25%–35%, say about 32%, meat; 20%–35%, say about 26%, sugar; 25%–40%, say about 35%, vegetable protein concentrate and have a moisture content of 17%–27%, say 25%. In this embodiment, as elsewhere in this specification, the water or moisture content is given in terms of percentage of the total wet weight of the product. More specifically, a major proportion and preferably at least 95% product weight is obtained from the meat, soluble solids and vegetable protein concentrate (each of which contains water) and the percent water is measured in terms of percentage of this total wet weight, the balance of the weight being supplied by humectants and texturizers, the anti-mycotic, coloring and flavoring.

The preferred embodiment of this invention will also include a ration balancing protein supplement, typically skim milk solids, which provides a supply of protein sufficient in amount and distribution to raise the total protein level as well as to supply certain proteins not provided by other sources. Use of such supplements permits attainment of a product having the necessary protein level and balance required for proper nutrition. Preferably this ration balancing protein supplement will constitute up to about 5% of the product.

Additional ingredients in the preferred product will include: desired flavors including meat fat, salt, etc.; nutrients including vitamins, minerals, etc.; and a red dye, preferably FD & C Red #2, or other appropriate dye may be employed to give the desired color. The flavor may constitute up to 2%–3% by weight of the product, and nutrients and dye, in total, will comprise about 1% or less.

It will be evident to those skilled in the art that the hereinabove discussed formulations will produce a product having a substantially neutral pH, say from 6.0 to 8.0, unless an acidifying or alkalizing agent were overtly added in sufficient quantities. However, the present invention does not contemplate the addition of such quantities of these agents since a pH value outside this range decreases the product palatability to an unacceptable degree.

In accordance with certain of its more specific aspects, therefore the novel process for forming the animal food product of this invention includes pasteurizing the meat component; creating a sugar solution, either prior to, incident to or after such pasteurization; mixing said pasteurized meat with the sugar solution, the moisture content of said mixture being about 17%–27%; and causing the aqueous phase to be absorbed by the meat component.

This may be achieved by heating the ingredients of the meat component to a point whereat moisture present in the meat is liberated whereafter the sugar is supplied in powder form to be dissolved in the liberated moisture. This process is continued at a sufficiently elevated temperature and for a time which will at least pasteurize the meat particles. Thereafter the non-meat major ingredients, e.g., the vegetable protein source (concentrate) will be added and distributed with respect to the meat components and the aqueous phase of sugar solids. This mixture is heated to a temperature at least above 160° F. and preferably to a temperature no higher than 250° F. for a period sufficient to cause a portion of the free aqueous phase not otherwise imbibed by the matrix of meat solids to be absorbed by the vegetable protein concentrate. This absorption serves to render the composite animal food less sticky and more handleable for subsequent processing such as extruding, pelleting, or other such shaping operation. The degree of absorption will be predicated upon the character of the vegetable protein concentrate, but in any event the cooking should be for a period which maximizes this absorption to the extent possible (usually less than 15 minutes); in most cases the vegetable protein concentrate will absorb in this period substantially all of the aqueous phase it is capable of absorbing. The minimum period called for in such cooking will be dictated by the temperature at which the mixture is cooked and the degree of absorption of the aqueous phase required to render the mixture handleable. Advantageously, incident to this cooking the vegetable protein concentrate will also undergo some degree of pasteurization and will imbibe sufficient of the sugars in solution to offer bacteriostatic protection to the vegetable protein concentrate and other materials present. On the other hand, this cooking period should not be so prolonged as to give rise to the development of "browning" precursers which can aggravate the development of a "browning" reaction and hence, give rise to premature darkening of the product. Usually, therefore, this cooking will not be prolonged and generally will be less than 15 minutes.

In practice of one preferred embodiment, the meat is pasteurized in combination with an emulsifier and all liquid ingredients, such as tallow, at a temperature of about 180° F. to 215° F., say preferably 212° F. for about 5 to 15 minutes, say 10 minutes. Upon completion of pasteurization, colors, anti-mycotic agent, crystallization retardant, flavors, and nutrients are added. Immediately following, all the remaining dry ingredients are added, such as soya flakes, soy hulls, bone meal, dried skimmed milk and sugar in one charge. The temperature of the total mass, due to the addition of these dry ingredients, drops to approximately 140° F. The total product is then cooked at a temperature preferably above 170° F., and typically 180° F. to 200° F., say 185° F. for 5 to 10 minutes, say 7 minutes. Upon completion of the final cook, the product is cooled to a temperature of about 60° F. to 80° F., say 70° F.

In the practice of another embodiment of this invention, the meat component of the charge is pasteurized at a temperature of about 180° F.–212° F., say 200° F., for about 5 to 15 minutes, say 10 minutes, to kill bacteria and to produce a liquefied meat. To this mixture, which is preferably maintained at about the pasteurization temperature, the flavors, nutrients, colors, texturizing agent or agents and an anti-mycotic agent are added. The vegetable protein is then added to the slurry while it is maintained at a temperature sufficiently high to effect gelatinization of the starch, preferably above 150° F. and typically at 150° F.–160° F., for 5–10 minutes. The sugar and protein balancing agents are then added to the mix while it is maintained at an elevated temperature of from 180°–220° F., say 200° F., for about 5–10 minutes.

The cooked mixture, upon achieving uniformity of texture, may be packaged according to conventional wrapping procedures, and it is an additional feature of this invention that such mixture may be packed in ordinary moisture-impermeable wrapping material without any need for sterilization.

Preferably, however, the product is formed into cylindrical patties about 3.5 inches in diameter and about 0.75 inch thick, each having a weight of about 3 oz. The preferred procedure for forming such patties includes the extrusion of the finished mixture at low pressures and at a temperature sufficiently low to prevent stickiness, into small cylinders, typically 0.125 to 0.25 inch in diameter, more commonly 0.1875 inch and having a length from 0.25 to 1.0 inch, commonly about 0.5 inch. Such extrusion may be effected in conventional extruding equipment, such as an Enterprise extruder, a Buffalo meat grinder, or the like. The so-extruded cylinders are then molded under low pressure into the desired hamburger-like cylindrical patties.

The so-prepared product is characterized by a completely meat-like appearance, color, consistency, texture, and general handleability. On being chewed, it has a meat-like chewy texture. It is particularly characterized by its extended storage life. Under normal ambient conditions, it may be stored for long periods (six-months or longer) without damage in a loose moisture-impermeable wrapping which is sufficient to protect the product under normal conditions of handling, however, the composition can be stored in an open unpackaged condition without undergoing bacterial deterioration. Wrapped in this inexpensive manner, the product requires no refrigeration to retain its advantageous characteristics even for extended storage periods without undergoing an undesirable darkening in color.

The density of the product will depend on the technique of fabrication including the degree of pressure used to form the patties. Typically, the density will be 45–70 pounds per cubic foot and most commonly about 50 pounds per cubic foot. It is apparent that the bulk density of the product may be controlled as desired.

It is particularly significant that the product of this invention is fully as palatable (i.e. as well liked by animals) as is the best equivalent canned animal food—this being far in excess of the generally low palatability or receptiveness of conventional low moisture content animal foods. It is also significant that two 3-ounce patties of the product of this invention are equal in feeding value to a 16-ounce can of a ration-type animal food.

Thus, it may be observed that the product of this invention possesses the desirable features of both canned and dry animal foods without including the undesirable features, and can thus meet the generally recognized tests of an ideal food for carnivorous animals.

The following examples set forth certain preferred formulations for animal foods which embody the principles of the present invention; the examples being formulations particularly adapted for use as dog foods. These formulations were prepared so that the requisite product moisture content according to this invention is derived entirely from water present in the various constituents, thereby avoiding any overt addition or removal of water. However, where a particular formulation does not accomplish this, it should be recognized that the present invention contemplates overt adjustment of product moisture to the defined level.

Example I

| | Percent |
|---|---|
| Poultry by-products | 31.0 |
| Sugar (dextrose) | 30.0 |
| Soy flakes | 36.5 |
| Potassium sorbate | 0.5 |
| Propylene glycol | 2.0 |

This product had a moisture content of 17.6% and a pH of 6.8.

Example II

| | Percent |
|---|---|
| Poultry by-products | 31.0 |
| Sugar (dextrose) | 30.0 |
| Soy flour and flakes | 29.0 |
| Non-fat milk solids | 5.0 |
| Poultry fat | 2.0 |
| Propylene glycol | 2.0 |
| Potassium sorbate | 0.5 |
| Minerals, vitamins, color, etc. | 0.5 |

This product had a moisture content of 28.6% and a pH of 6.9.

Example III

| | Percent |
|---|---|
| Scalded beef tripe | 29.0 |
| Frodex (42 dextrose equivalent corn sugar) | 25.3 |
| Soy flakes | 30.0 |
| Flaked soybean hulls | 3.5 |
| Dried skim milk | 4.0 |
| Blanched fancy tallow | 2.0 |
| Propylene glycol | 2.0 |
| Potassium sorbate | 0.3 |
| Minerals, vitamins, color, etc. | 3.9 |

This product had a moisture content of 20.6% and a pH of 6.3.

Example IV

| | Percent |
|---|---|
| Meat by-products (beef tripe, tongue gullets, and cheek trimmings) | 32 |
| Soy flakes | 30 |
| Sugar (dextrose) | 21 |
| Soy bran flakes | 3 |
| Skimmed milk, dried | 2.5 |
| Calcium and phosphorus supplement (bone meal and dicalcium phosphate) | 3.3 |
| Propylene glycol | 2.0 |
| Sorbitol | 2.0 |
| Animal fat | 1.0 |
| Emulsifier (mono- and di-glyceride) | 1.0 |
| Salt | 0.6 |
| Potassium sorbate | .3 |
| Minerals, vitamins, color, etc. | 0.25 |

This product had a moisture content of 21.0% and a pH of 6.8.

Example V

| | Percent |
|---|---|
| Fish by-products | 34 |
| Soy flour | 32 |
| Sugar | 20 |
| Sorbitol | 3 |
| Propylene glycol | 2 |
| Fish oil | 2 |
| Potassium sorbate | 0.3 |
| Flavor, minerals, vitamins, color, etc. | 6.7 |

This product had a moisture content of 20.0% and a pH of 6.5.

A specific example of the process of this invention is as follows: A mixture comprising 18.4 pounds of scalded beef tripe, 6.1 pounds of rough tongue gullets, and 6.1 pounds of beef cheek trimmings was placed in a double-jacketed sigma mixer and heated to 212° F. with indirect steam over a period of 10 minutes. To the liquefied meat was added 2.0 pounds of propylene glycol, 0.3 pound of potassium sorbate, 0.2 pound of garlic oil, 2 pounds of tallow, 0.6 pound of salt, 0.25 pound of dicalcium phosphate, 0.6 pound of vitamin premix, 0.001 pound of cobalt sulfate, and 0.005 pound of red dye No. 2. Mixing continued during the addition of these ingredients and the temperature of the mix was maintained at about 200° F.–212° F.

The liquid temperature was then reduced to about 160° F. after which untoasted soy flakes (31.5 pounds) were mixed in, and the resulting thick mixture was stirred for about 5–10 minutes. Then, 25.9 pounds of Frodex (a commercial mixture containing 42% dextrose) and 5.1 pounds of dried skim milk were added to the mixture, and subsequently 3.5 pounds of flaked soybean hulls were added.

The mixture was thoroughly blended and then extruded through a low temperature, low pressure Enterprise extruder having a round 0.1875 inch diameter nozzle. The extruded cylinder was cut into lengths of about 0.5 inch and the lengths were then formed by low pressure into three-ounce patties having a diameter of 3.5 inches and a thickness of 0.75 inch.

The so-prepared patties had a moisture content of about 25%, a pH of 6.8, a protein content of about 22%, and a fully balanced measure of other desired nutritional ingredients. It was highly palatable and had an extended storage life even in the absence of refrigeration.

Example VI

The following is a formulation of an intermediate moisture pet food product containing meat meal:

| | |
|---|---|
| Water | 24.1 |
| Meat meal | 7.3 |
| Soy flakes | 33.5 |
| Sucrose | 22.0 |
| Soya hulls | 3.1 |
| Sorbitol | 2.1 |
| Tallow | 4.2 |
| Sodium chloride | 1.0 |
| Potassium sorbate | 0.3 |
| Propylene glycol | 2.1 |
| Garlic | 0.2 |
| Red dye | 0.01 |

The liquid portion of the formulation consisting of the water, sorbitol, tallow, propylene glycol was brought to a boil. Thereafter, the remainder of the ingredients in dry form were added to the boiling liquid. This complete mixture was brought to a temperature of 180° F. at which temperature the mixture was held for seven minutes. The mixture was thereafter cooled to 80° F. and extruded into pellets ¼" in diameter and approximately ¼" long. The pellets were then assembled in a polyethylene bag which was sealed to minimize water vapor transmission and stored at room temperature. No discoloration of the red meaty color of the product was noted after storage at room temperature for a period of six months. Equally important, product did not undergo bacteriological decomposition or development of mold or yeast.

Example VII

| | |
|---|---|
| Water | 22.0 |
| Protein meat meal | 8.4 |
| Sucrose | 22.0 |
| Soya hulls | 2.0 |
| Sorbitol | 2.0 |
| Sodium chloride | 1.0 |
| Potassium sorbate | 0.3 |
| Propylene glycol | 2.1 |
| Garlic | 0.2 |
| Red dye | 0.0075 |
| Soya flakes | 30.5 |
| Dried skim milk | 2.5 |
| Mono- and di-glycerides | 1.0 |
| Bone meal | 2.0 |
| Tallow (surface applied) | 4.0 |

The liquid portion of the aforementioned ingredients, i.e., water, sorbitol, propylene glycol, mono- and di-glycerides, but not the tallow, was heated to a boil and the remaining dry ingredients were added to the boiling liquid. Specifically, these ingredients were heated for ten minutes in a steam jacketed mixer. Thereafter, the dry ingredients were added to the boiling liquid and heated to 180° F. for ten minutes. The mixture was then cooled to 80° F. by discharging the ingredients from the mixer onto a cooling pan, the mixture being allowed to cool by room temperature air. The mixture was then extruded through a meat grinder which produced ¼" diameter pellets, approximately ¼" in length. These pellets were packaged in a polyethylene bag, other such pellets were assembled as patties and packaged in a cellophane wrapper, but could be inserted into a polyethylene-coated paperboard carton, just sufficient to offer protection against any significant water vapor transmission from the product to the surrounding atmosphere. The packaged product in any event did not undergo significant discoloration in that it retained a fresh red meat-like appearance and did not give rise to bacteriological decomposition after storage at room temperatures for six months. The product can be fed as is or consumed with water or other liquids fed separately. The product, when eaten, has a moist texture, feels moist to the touch, is soft, and has a meat-like appearance.

*Example VIII*

Any one of the pellets of the foregoing type, upon their production can be loosely packed into a poly-coated or foil-laminated canister or other suitable non-hermetic container adapted to be opened and to disperse a desired quantity of pellet-shaped dog food material to a pet or other animal serving tray. The pellets are quite water absorbent, and as a result can be further hydrated by mixing them directly with water so as to adjust their moisture content to that of conventional type dog foods, e.g., 75% moisture. Consequently, texture and appearance of this product will be quite comparable to that of the typical dog ration, for example, which has a soft moist meaty appearance and texture.

*Example IX.—Intermediate moisture cat food*

| Ingredients: | Parts by weight |
|---|---|
| Tripe | 18.0 |
| Fish (whole cod and smelt) | 6.0 |
| Beef cheek trimmings | 6.0 |
| Soy flakes | 31.5 |
| Dry corn syrup solids (42 DE) | 21.4 |
| Soy hulls | 3.0 |
| Dry non-fat milk solids | 2.5 |
| Bone meal | 2.1 |
| Dicalcium phosphate | 1.4 |
| Propylene glycol | 2.0 |
| Sorbitol | 2.0 |
| Tallow | 2.0 |
| Mono- and di-glycerides | 1.0 |
| Sodium chloride | 0.6 |
| Potassium sorbate | 0.3 |
| Garlic | 0.2 |
| Vitamin mix | 0.1 |
| FD & C red dye | Trace |

The tripe, fish, beef cheeks, tallow, propylene glycol, sorbitol, and mono- and di-glycerides were heated to boiling. The remaining dry ingredients were added and the mixture heated to 180° F. This temperature was maintained for seven minutes. The product was then allowed to cool to room temperature. The ingredients were then ground through a meat chopper so that there were no large particles. At this point the material had a doughy consistency; this dough was rolled into a sheet about ¼" thick and then cut into large fish-shaped pieces. The pieces had a salmon-like color. The dough can be extruded through a fish-shaped orifice in an extrusion apparatus. The product extruded evenly and can be sliced continuously by a rotating cutter into the desired fish-shaped pieces. The final product had a moisture content of 25% and could be loosely packaged in any non-hermetic envelope or other container without undergoing micro-biological deterioration even after six months storage at room temperature.

*Example X.—Intermediate moisture loosely wrapped dog food*

| Ingredient: | Parts by weight |
|---|---|
| Chopped meat by-products (tripe, udders, cheek trimmings, tongue trimmings, gullets, etc.) | 32.0 |
| Defatted soy flakes | 31.0 |
| Sucrose | 21.7 |
| Flaked soy bean hulls | 3.0 |
| Dicalcium phosphate | 3.0 |
| Dried non-fat milk solids | 2.5 |
| Propylene glycol | 2.0 |
| Bleachable fancy tallow | 1.0 |
| Mono- and di-glycerides | 1.0 |
| Sodium chloride | 1.0 |
| Potassium sorbate | 0.3 |
| FD & C red dye | 0.006 |
| Garlic | 0.2 |
| Vitamin and mineral premix | 0.06 |

An intimate mixture of the foregoing ingredients was made by first chopping the meat by-products into small pieces, which were then heated in combination with sorbitol, propylene glycol, mono- and di-glycerides, and tallow to 212° F. to effect pasteurization and produce a liquefied slurried meat composition. The aforesaid slurry was then finely ground into a more or less pulpy, pumpable, flowable puree consistency. This hot pureed form of slurry was then proportionately blended with the remaining dry ingredients of the formulation in a steam jacketed cooker wherein it remains for a period of approximately 1½ minutes at an elevated temperautre of about 200° F., the product being under continuous agitation throughout this cooking phase. This cooked mixture had a plastic, extrudable, shape-retaining consistency. The moisture content of this composition was 25.0%. The finely comminuted meat by-products and the soya flakes had the aqueous phase evenly distributed throughout, thereby assuring a maximum bacteriological protection to the final product.

The pasteurized mixture was immediately cooled by passage through a refrigerated heat exchanger to an ambient temperature, i.e., 80° F. The cooled mixture was then charged to an extruder where it was formed into particles approximately ⅛" in diameter and ½" long. The extruded granules or pellets were then deposited directly onto a sheet of polyvinylidene chloride-coated cellophane for enwrapment. Individual portions of the pellets and the wrapping material were then shaped into a disc or patty form by bringing a male plunger into a female shaping member which simultaneously enwraps part of the coated cellophane about the thusly shaped animal food, whereafter the free edge portions are overlapped on one another and heat sealed.

This packaged product can be subjected to the extremes of non-refrigerated storage in every representative area within the United States for a period of not less than six months without undergoing bacterial decomposition or experiencing mold or yeast growth. The unwrapped product is very meat-like in appearance and texture. The unwrapped product can be broken into chunks and fed as is, or otherwise fed to the animal consistent with his normal daily regimen.

Although this invention has been described with reference to specific examples, it will be obvious to those skilled that various other embodiments can be practiced within the scope of this invention.

What is claimed is:

1. A deformable and shape-retaining nutritionally balanced meat-based palatable moist animal food composition of substantially neutral pH of 6.0–8.0 and adapted to be packaged in non-hermetic packaging material without sterilization and stored for long periods without refrigeration comprising a pasteurized matrix of proteinaceous meaty materials and vegetable protein concentrate normally capable of supporting bacteriological growth and having an aqueous solution of water soluble solids including sugar incorporated in said matrix materials in bacteriostatic amount, the moisture level in said composition being less than 30% and greater than 15% by weight thereof and imparting plasticity to the composition, the level of the water soluble sugar solids being greater than 15% and up to 35% by weight of said composition, the weight level of said water soluble solids being greater than that of said moisture and the sugar level constituting a major percent by weight of the water soluble solids, a major proportion by weight of said matrix materials being in a substantially hydrated condition, said aqueous solution being uniformly dispersed throughout said matrix, said composition having an effective level of anti-mycotic in intimate contact with said matrix materials, whereby the composition is maintained in a mold-free condition.

2. A deformable and shape-retaining nutritionally balanced meat-based palatable moist animal food composition of substantially neutral pH of 6.0–8.0 and adapted to be packaged in non-hermetic packaging material without sterilization and stored for long periods without refrigeration comprising a pasteurized matrix of proteinaceous meaty and 25%–40% vegetable materials normally capable of supporting bacteriological growth and having an aqueous solution of water soluble solids including sugar incorporated in said matrix materials in bacteriostatic amount, the moisture level in said composition being less than 30% and greater than 15% by weight thereof and imparting plasticity to the composition, the level of the water soluble sugar solids being greater than 15% and up to 35% by weight of said composition, the weight level of said water soluble solids being greater than that of said moisture and the sugar level constituting a major percent by weight of the water soluble solids, a major proportion by weight of the components of said matrix being in a substantially hydrated condition, said aqueous solution being uniformly dispersed throughout said matrix, said composition having an effective level of a texturizer for maintaining said sugar solids and hydrated matrix material desirably plastic and an anti-mycotic in intimate contact with said matrix whereby the composition is maintained in a mold-free condition.

3. A deformable and shape-retaining meat-based palatable moist animal food composition of substantially neutral pH of 6.0–8.0 and adapted to be packaged in non-hermetic packaging material without sterilization and stored for long periods without refrigeration comprising a pasteurized matrix of nutritionally balanced materials normally capable of supporting bacteriological growth and containing proteinaceous meaty and vegetable materials, and also comprising an aqueous solution of water soluble solids including sugar incorporated in said matric materials, the meaty proteinaceous materials comprising 25–35% and the vegetable protein material 25–40% by weight of said composition, the moisture level in said composition being less than 30% and greater than 15% by weight thereof and imparting plasticity thereto, the level of added water soluble sugar solids being greater than 15% and less than 35% by weight of said composition, the weight level of said water soluble solids being greater than that of said moisture and the sugar level constituting a major percent by weight of the water soluble solids, a major proportion by weight of components of said composition other than those of said aqueous solution being in a substantially hydrated condition, said aqueous phase being uniformly dispersed throughout said matrix and said soluble solids being at a level at which bacteriostatic stabilization of the composition of said matrix against microbiological spoilage is obtained, said composition having an effective level of anti-mycotic selected from the class consisting of sorbic acid and its sorbate salts in intimate contact with said matrix materials whereby the composition is maintained in a mold-free condition.

4. A deformable and shape-retaining nutritious meat-based palatable moist animal food composition of substantially neutral pH of 6.0–8.0 adapted to be packaged in non-hermetic packaging material without sterilization and stored for long periods without refrigeration comprising a pasteurized matrix of nutritionally balanced materials normally capable of supporting bacteriological growth and containing a particulate proteinaceous meaty material, a vegetable protein source and an aqueous solution of water soluble solids including sugar incorporated in said matrix materials, the moisture level in said composition ranging between 17–27% by weight thereof and imparting plasticity thereto, the level of the water soluble sugar solids ranging between 20–35% by weight of said composition, the weight level of said added water soluble solids being greater than that of said moisture and the sugar level constituting a major percent by weight of the water soluble solids, said aqueous solution being uniformly dispersed throughout said matrix and said soluble sugar solids being at a level within said range high enough to exert a bacteriostatic effect sufficient to stabilize the composition against microbiological spoilage, the matrix materials being in a substantially hydrated condition, said composition having incorporated therein an effective level of an anti-mycotic whereby the food is maintained in a mold-free condition.

5. An animal food composition according to claim 4 wherein the level of said proteinaceous meaty material ranges between 25–35% and said vegetable protein source ranges between 25–40% by weight of the composition.

6. An animal food composition according to claim 5 wherein a major proportion by weight of the vegetable protein concentrate is in a de-oiled form.

7. A deformable and shape-retaining nutritious meat-based palatable moist animal food composition of substantially neutral pH of 6.0–8.0 and adapted to be packaged in non-hermetic packaging material without sterilization and stored for long periods without refrigeration comprising a pasteurized matrix of intimately mixed materials normally capable of supporting bacteriological growth and containing principally: (i) a first component consisting of a particulate proteinaceous meaty material derived from the group consisting of meat, meat by-products and hydrated meat meal, (ii) a second vegetable component comprising a de-oiled vegetable protein source derived from an oil seed, (iii) a ration-balancing milk protein supplement, (iv) a fourth component having other nutritional supplements selected from the group consisting of vitamins, minerals, and mixtures thereof and (v) as a fifth component an aqueous solution of water soluble solids including sugar, the moisture level in said composition being less than 30% and greater than 15% by weight thereof and imparting plasticity to the composition, the level of water soluble sugar solids being greater than 15% and less than 35% by weight of said composition, the weight level of said water soluble solids being greater than that of said moisture and the sugar level constituting a major percent by weight of the water soluble solids, such fifth component being uniformly dispersed throughout the matrix of the first four components and said soluble solids being at a level at which bacteriostatic stabilization of the composition against microbiological spoilage is obtained, a major proportion by weight of the components other than said fifth component being in a substantially hydrated condition, said composition having incorporated therein an effective level of an anti-mycotic.

8. A package of nutritionally balanced meat-based palatable moist deformable and shape-retaining animal food of substantially neutral pH of 6.0–8.0 comprising a pasteurized matrix of proteinaceous meaty materials and vegetable protein concentrate normally capable of supporting bacteriological growth, said food being packaged without sterilization in a substantially moisture-impermeable enwrapment and having an aqueous solution of added water soluble solids including sugar and in bacteriostatic amount, the moisture level in said food being less than 30% and greater than 15% and imparting plasticity to the composition, the level of water soluble sugar solids being greater than 15% and up to 35% by weight of said food, the weight level of said water soluble solids being greater than that of said moisture and the sugar level constituting a major percent by weight of the water soluble solids, said aqueous solution being uniformly dispersed throughout said matrix, a major proportion by weight of the components of said matrix materials being in a substantially hydrated condition, said food having an effective level of anti-mycotic and humectant therein in intimate contact with said matrix materials whereby the food is maintained in a mold-free but moist condition.

9. Process for manufacturing a deformable and shape-retaining nutritious palatable moist animal food of substantially neutral pH of 6.0–8.0 comprising proteinaceous meaty matrix materials having sugar solids added thereto and normally capable of supporting bacteriological growth comprising the steps of: subjecting said matrix materials including said added sugar solids to heat and mixing together with water amounting to 15–30% by weight of the mixture for a period of time sufficient to form an aqueous solution of the water soluble solids of said mixture and to disperse said solution uniformly throughout said matrix materials and hydrate same and thereby form a shapable pasteurized plastic composition wherein said soluble solids are at a level in solution providing a becteriostatic stabilization against microbiological spoilage at said substantially neutral pH, the weight level of water soluble solids in said composition being greater than that of said moisture, sugar constituting a major percent by weight of the water soluble solids and amounting to 15–35% by weight of said composition; forming said composition into a desired shape; and packaging the shaped composition without sterilization in substantially moisture-impermeable wrapping material.

10. Process according to claim 9 wherein said mixture of matrix materials sugar solids and water is heated to a temperature of at least 160° F.

11. Process according to claim 10, said mixture being cooled to below pasteurizing temperature prior to packaging.

12. Product according to claim 1 wherein said anti-mycotic is distributed throughout said composition.

13. Product according to claim 1 wherein said anti-mycotic is applied to the surface of said composition.

14. Product according to claim 1 wherein said anti-mycotic is applied to the surface of the packaging material in contact with said composition.

15. Product according to claim 1 wherein said sugar comprises sucrose.

16. A food composition according to claim 7 wherein said matrix material includes proteinaceous meaty material that has been subdivided to a finely divided particulate form and the vegetable protein source includes soy flakes, said materials being intimately mixed with one another.

References Cited by the Examiner

UNITED STATES PATENTS

| | | | |
|---|---|---|---|
| 583,739 | 6/97 | Friderichsen | 99—7 |
| 675,656 | 6/01 | Hlawitschka | 99—7 |
| 2,558,092 | 6/51 | Kelly | 99—7 |
| 2,801,173 | 7/57 | Devereaux | 99—7 X |
| 2,965,489 | 12/60 | Clickner | 99—9 |
| 3,065,084 | 11/62 | Melnick | 99—224 |
| 3,115,409 | 12/63 | Hallinan et al. | 99—7 |

FOREIGN PATENTS

| | | |
|---|---|---|
| 560,490 | 7/58 | Canada. |
| 27,114 | 1896 | Great Britain. |

A. LOUIS MONACELL, *Primary Examiner.*